(12) United States Patent
Sporny et al.

(10) Patent No.: US 8,225,320 B2
(45) Date of Patent: Jul. 17, 2012

(54) PROCESSING DATA USING CONTINUOUS PROCESSING TASK AND BINARY ROUTINE

(75) Inventors: Manushantha (Manu) Sporny, Blacksburg, VA (US); Robert Kenneth Butterfield, Reston, VA (US); Norton Kenneth James, Reston, VA (US); Patrick Quinn Gaffney, Herndon, VA (US)

(73) Assignee: Advanced Simulation Technology, Inc., Herndon, VA (US)

( * ) Notice: Subject to any disclaimer, the term of this patent is extended or adjusted under 35 U.S.C. 154(b) by 1300 days.

(21) Appl. No.: 11/844,082

(22) Filed: Aug. 23, 2007

(65) Prior Publication Data

US 2008/0178180 A1      Jul. 24, 2008

Related U.S. Application Data

(60) Provisional application No. 60/824,105, filed on Aug. 31, 2006.

(51) Int. Cl.
  *G06F 9/45*     (2006.01)
  *G06F 9/00*     (2006.01)
(52) U.S. Cl. .................................. 718/102; 712/220
(58) Field of Classification Search .............. 718/102; 712/220
  See application file for complete search history.

(56) References Cited

U.S. PATENT DOCUMENTS

| | | | |
|---|---|---|---|
| 4,484,275 A | 11/1984 | Katzman et al. | |
| 4,553,202 A | 11/1985 | Trufyn | |
| 4,993,017 A | 2/1991 | Bachinger et al. | |
| 5,291,614 A | 3/1994 | Baker et al. | |
| 5,550,965 A | 8/1996 | Gabbe et al. | |
| 5,590,323 A * | 12/1996 | Kartalopoulos | 718/106 |
| 5,592,671 A | 1/1997 | Hirayama | |
| 5,721,922 A | 2/1998 | Dingwall | |
| 5,923,339 A | 7/1999 | Date et al. | |
| 5,944,809 A | 8/1999 | Olarig et al. | |
| 5,995,745 A | 11/1999 | Yodaiken | |
| 6,009,389 A | 12/1999 | Dokic et al. | |
| 6,665,732 B1 | 12/2003 | Garofalakis et al. | |
| 2002/0010844 A1 | 1/2002 | Noel et al. | |
| 2002/0016892 A1 | 2/2002 | Zalewski et al. | |
| 2004/0088704 A1 * | 5/2004 | Owen et al. | 718/100 |
| 2006/0031844 A1 | 2/2006 | Dice et al. | |
| 2006/0112208 A1 | 5/2006 | Accapadi et al. | |
| 2006/0112390 A1 | 5/2006 | Hamaoka | |
| 2006/0133513 A1 | 6/2006 | Kounnas | |
| 2006/0143336 A1 | 6/2006 | Stroobach et al. | |
| 2006/0150185 A1 | 7/2006 | McKenney et al. | |

* cited by examiner

*Primary Examiner* — Meng An
*Assistant Examiner* — Brian Chew
(74) *Attorney, Agent, or Firm* — Diederiks & Whitelaw PLC (57) ABSTRACT

A computing method and system is presented that modifies a standard operating system utilizing two or more processing units to execute continuous processing tasks; such as processing or generating continuous audio, video or other types of data. One of the processors is tasked with running the operating system while each processing unit is dedicated towards running a single continuous processing task. Communication is provided between both processors enabling the continuous processing task to utilize the operating system without being affected by any operating system scheduling requirements.

21 Claims, 8 Drawing Sheets

PROCESSING DATA USING CONTINUOUS PROCESSING TASK AND BINARY ROUTINE

CROSS REFERENCE TO RELATED APPLICATION

The present application claims the benefit of U.S. Provisional Patent Application Ser. No. 60/824,105 filed Aug. 31, 2006 entitled "Computing Method and System for Continuous Processing Task".

FIELD OF THE INVENTION

The present invention pertains to the art of computer operating systems and, more particularly, to computer operating systems that process data such as audio or video information in a substantially continuous and un-interrupted manner.

DISCUSSION OF THE PRIOR ART

Computer hardware systems and their associated computer operating systems have changed dramatically over time. Most initial computer systems started with simple single processors and a simple associated memory. The cost of processing power was extremely expensive and, therefore, operating systems were generally designed to use the processing power as efficiently as possible. However, as time has passed, computer systems have been developed as multiprocessor systems, often having several processors sharing a common memory.

The provision of multiple processors within a single system opens up opportunities to have computer systems process large amounts of data more effectively. Conventional operating systems tend to still employ computer resources based on the simple single processor model and, therefore, they have a disadvantage of being unable to use the available computing resources efficiently in a multiprocessor system. Also, most operating systems still assume that processing power is at a premium and should be used efficiently, sometimes at the expense of performance of the overall system. Such computer operating systems are typically time-shared programs designed to optimize the use of the computing resources, or occasionally the computer response time, or some other objective. While such general operating systems work fairly well for most processes, the operating systems have to be modified to handle tasks or processes which must be conducted in a timely manner and have a particular scheduling deadline, such as audio or video generation.

To address this problem, operating systems have developed various methods to deal with proper program execution when coupled with a scheduling deadline. Typically, scheduling deadlines can be broken out in three different categories. There are hard deadlines, soft deadlines and no scheduling deadlines. Tasks that have hard deadlines are defined as tasks that must complete a certain amount of work before a specific time. If the work is not completed by the specific time, the task fails. For completing such tasks, a computing system typically called a "hard real-time operating system" is used. For example, such system may be used in a nuclear reactor control facility to ensure the proper operation of the facility, where a missed deadline would result in catastrophic occurrence. Another example of a task that would require a hard real-time operating system would be the control of a liquid fuel rocket mounted on a test platform. If the rocket does not shut down according to a precisely timed sequence, the results can be both spectacular and unwelcome.

In some cases, a task does not fail if it takes longer than expected to complete. Computing systems that deal with such tasks that have soft deadlines are typically referred to as "soft real-time operating systems". In such systems, tasks are given priorities rather than scheduling deadlines. This ensures that a high priority task will finish before a low priority task, but the time taken to execute the task is not necessarily guaranteed.

The main difference between soft and hard real-time systems is that a task's output may be useful if it takes longer than its given amount of time in a soft real-time system, but the result will not be useful in a hard real-time system. A system that is hard real-time has pseudo-deterministic or very deterministic processing steps. Often, the terms "non real-time processing steps" and "non-deterministic operations" are used interchangeably. If a task is deterministic, it is known that that task will not take longer than a certain amount of time. However, in a non-hard real-time system, a task may take a non-deterministic amount of time to complete. A good example of a soft real-time system is a system that mixes prerecorded audio data and streams the data to a recording device. All audio buffers must be kept full, thus the audio generation and streaming tasks have the highest priority. Such systems may include large audio buffers in an attempt to counter-act the effects of scheduling jitter.

For the third type of tasks, i.e., those that have no deadlines, there is simply no guarantee as to when any particular task will complete its execution. Therefore, such systems can only be operated in an environment wherein: (1) it simply does not matter when the tasks end and (2) the result will still be useful.

Real-time operating systems apply priorities to real-time tasks that will each represent independent continuous processes that are not driven by an event. The critical metric of a real-time operating system is the latency or maximum response time to a processing request. Latency is the direct result of a process being executed that is not part of a primary task and must be kept as small as possible for processing continuous tasks, such as, interactive voice or video communications. Latency is a direct result of assigning a processing resource to the secondary discontinuous functions of the general process operating system. The purpose of a real-time operating system is to guarantee that the external event is processed by its task with minimum delay even when the process is not, at that instant, running on the processor.

It is impossible to run systolic arrays in real-time general-purpose operating systems without some latency, but the general idea is to reduce the latency as much as possible.

It is also desirable to allow multiple continuous processing, such as audio or video stream manipulations, to occur concurrently without interruption, while simultaneously allowing access to the full functionality of a general-purpose operating system including efficient processing of a non real-time discontinuous application characteristic of any general-purpose operating system. It is also desirable to provide the optimum utilization of the available processing resources of a multiple processor configuration.

There have been several attempts to provide predetermined guarantee of access to cycle time on a processor for continuous processes on a general purpose operating system. One approach has been to assign priority processing resources via an insertion code into the kernel that suspends normal machine housekeeping functions of an operating system, such as disk access, in some fashion, commonly referred to as "real-time modification". U.S. Pat. No. 5,995,745 to Yodaiken is designed to provide "real-time" access to processing for one or more tasks, while also allowing general-purpose discontinuous functions of the operating system to also operate in a single processor. The down side of these "RT modification" techniques is that they cripple the efficiency of the general purpose operating system by interrupting tasks which are only accomplished efficiently when allowed to run to completion.

Another approach has been to allow a general purpose operating system to retain its standard, more efficient, priority structure and process the continuous tasks only as and when the processor is made available by the operating system. For this technique to work, without losing data, large buffers are required at the input and output stages of the continuous tasks in order to ensure no loss of data to the signal processing of the continuous task. This use of large buffers inevitably results in latencies and delays in the output that are unacceptable to a user. As mentioned above, latency is a critical parameter which must be kept as small as possible for continuous processing tasks such as interactive voice or video communications.

Another approach is the "dedicated black-box" approach which is often employed in critical operations such as aircraft flight directors, to dedicate the processor entirely to the single continuous task. This of course means that the user would not have access to the functionality of a general-purpose operating system, which makes such an approach completely unworkable in many areas such as audio processing.

In yet another approach, the Advanced Simulation Technology Digital Aural Cue System uses a limited operating system on an X86 processor for non-signal processing functions and communicates with DSP cards for the dedicated signal processing of audio data. In this system, neither part of the system can operate without the other, and each is closely dependent upon the operation of the other. It is a heavily customized limiting operating system. While some real-time processing was conducted on the X86, the signal processor was not a general-purpose processor.

As can be seen from the above-discussion, there exists a need in the art for a system that avoids all of the complexity and processing inefficiencies inherent in real-time systems and that can also operate on a general-purpose operating system. Furthermore, such a system should allow all continuous tasks of an operating system to occur without interruption or interference. There is also a need in the art that this system be able to use the same type of processor for general processing and signal processing functions and be applied to signal processing tasks which are inherently continuous; and when would otherwise exhibit an unacceptable lack of continuity, or perceptible latency in their processing.

SUMMARY OF THE INVENTION

The present invention avoids all the complexity and processing inefficiencies inherent to real-time systems by separating the operations of discontinuous tasks and allowing them unhindered access to a processor while providing shared memory and peripheral access to the transfer of data into and out of additional processors, which are dedicated and uninterrupted, to continuous tasks. The present invention includes a new type of task for operating systems, i.e., the continuous processing task. The continuous processing task is a task that cannot be interrupted and, thus, must be scheduled on one processing unit for the lifetime of the process. This process, while being isolated from the operating system scheduler, has access to all operating services via an asynchronous interface. The invention comprises a method and system for attaining continuous processing of tasks while making a set of operating system services available to the continuous processing task.

The computer itself processes data and comprises at least first and second processing units, along with an associated memory for storing data information accessible by both the first and second processing units. Running on the computer system is a general-purpose operating system. A continuous processing task that cannot be preempted by the operating system is assigned by a scheduler to run on one of the processing units. A discontinuous task is assignable to any of the processors not assigned a continuous processing task. A non-blocking shared communications device is provided which may communicate with the continuous processing task. Additional binary routines, which extend the functionality of the continuous processing task, may be added to the continuous processing task via the communication device. The routine may have a load and unload value associated therewith, which are used when starting and stopping the binary routine. A plurality of user-level device drivers running in the continuous processing task are connected to either an internal device or an external device for transmitting input data to the continuous processing task. A network may be provided to connect the continuous processing task. A device to synchronize retrieving timing pulse data from the network and to begin a continuous processing task routine is provided along with a device to synchronously or asynchronously retrieve timing pulse data from the network to begin a continuous processing routine. Data being processed is preferably audio waveform data. In an alternative embodiment, the invention may use multiple computer systems, which communicate with one another, to distribute various continuous processing tasks.

The above-described computer system may operate using the following method. A continuous processing task is assigned so that it will never be preempted for any reason and the continuous processing task is only stopped when requested. A processing system that is not already running a continuous processing task is chosen to run a new continuous processing task. A monotonic task may be executed on the processor running a continuous processing task in compressed time if all inputs of the monotonic task are known and extra processing resources are available. Communication is performed between the continuing and discontinuing processes with the non-blocking shared communication device. The continuous processing task may communicate with other continuous processing tasks via the communication device to add a binary routine so that they may execute within the continuous processing task. A load and unload value is associated with the binary routine so that the binary routine may be stopped due to excessive use of continuous processing task resources. Additionally, continuous processing tasks and discontinuous tasks are notified when the binary routine is stopped. A user level device driver is designated to perform communication between internal and external resources without resulting in any operating system overhead, other than processing interrupt detection and flagging. A user level device driver is employed inside the continuous processing task to perform input and output operations. The counter is updated via the non-blocking shared communications device and a scheduler is notified that the counter does not update in a specific time increment. A routine is executed within the continuous processing task based on a timing pulse data received via the communication device.

When other continuous processing systems are used, the continuous processing tasks are split among continuous processing task processing systems so that minimum processing latency is achieved by performing dependent parallel steps on systems external to the controlling continuous processing task processing system. Time reference is provided to the continuous processing task and routines are executed within the continuous processing task based on the time reference.

More specifically, in a further aspect of the invention, the continuous processing task obtains a time reference that provides synchronization to the real world. This can be achieved in several ways, including: a timing pulse communicated between continuous processing task process routines, a plurality of continuous processing tasks, external devices, a local clock counter updated by the processing hardware and/or clock oscillators, a general purpose phase locked loop mechanism which is inherently part of the continuous processing task, or more traditional mechanisms such as the Network Time Protocol running in a discontinuous task.

In a further aspect of the invention, multiple general purpose shared memory operating systems are linked via a communication network and synchronized via a timing pulse data. The timing pulse, which also carries data processing parameters, is fed directly into the continuous processing task, allowing multiple systems to continuously generate data in a synchronized fashion.

In yet a further aspect of the invention, insertion of a real-time operating system is not required due to the second processor not needing any scheduling changes.

In a further aspect of the invention, a binary routine may be added to the continuous processing task at run-time without the need for the continuous processing task to halt processing. The binary routine has a load and unload order specified, such that if the binary routine consumes more processing resources than are available, it is unloaded by the continuous processing task without the need to stop the task. This provides graceful addition and removal of processing routines for continuous processing tasks. This method also provides a means by which the continuous processing task may notify other tasks that the 1o binary routine has been started or halted.

In a significant aspect of the invention, a packet-speed audio creation, processing, and distribution system is described that uses multiple continuous processing tasks to process a large audio model. Each continuous processing task is implemented as a software digital is signal processing task. Multiple continuous processing task systems are linked via a communication network and work is distributed among each continuous processing task system such that at most there is a two hop packet delay between an input signal and output signal.

Additional objects, features and advantages of the present invention will become more readily apparent from the following detailed description of a preferred embodiment when taken in conjunction with the drawings wherein like reference numerals refer to corresponding parts in the several views.

DETAILED DESCRIPTION OF THE PREFERRED EMBODIMENT

Figure 1:
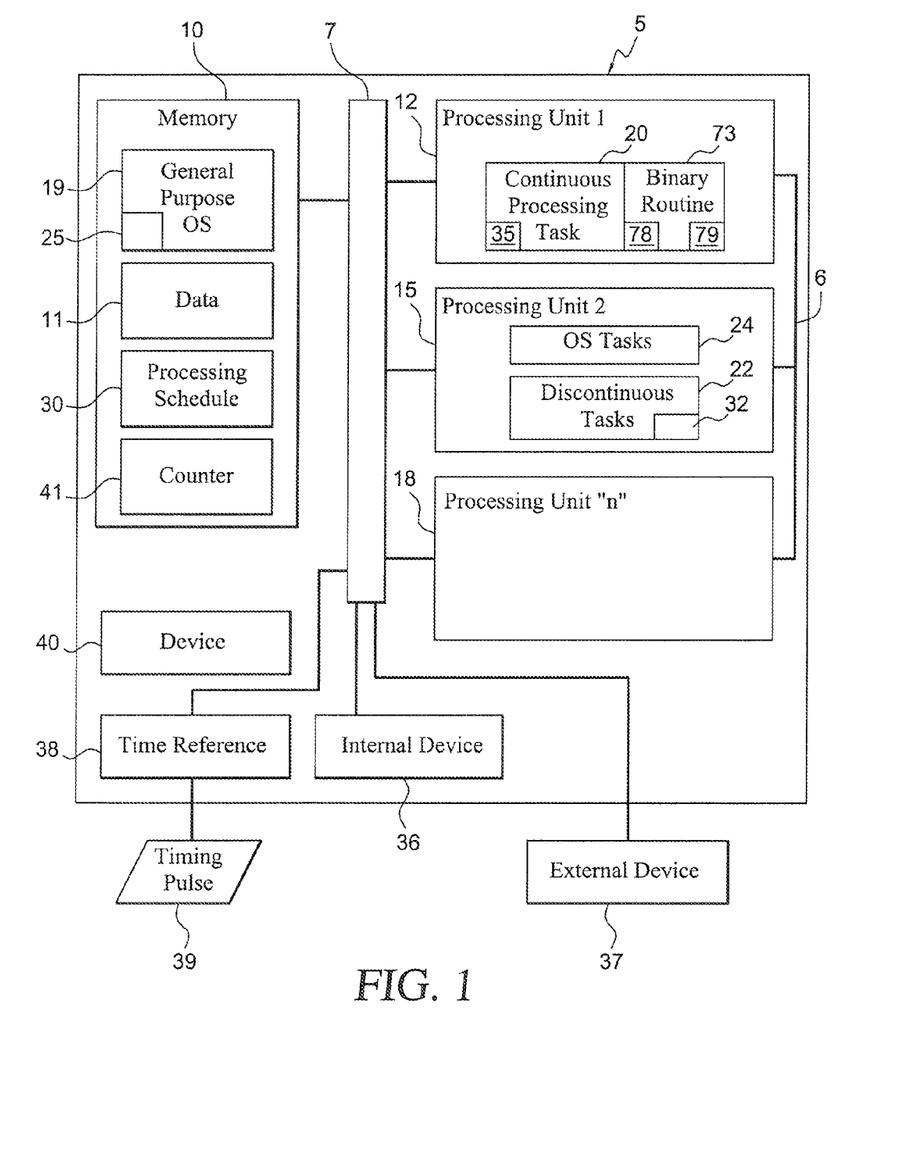
FIG. 1 is a system diagram of components described in this invention.

FIG. 1 depicts some of the basic components of a system for processing continuous tasks 5. A group of processors 6 is provided for running certain tasks and is connected by a non-blocking communication device 7 to a memory 10. FIG. 1 shows first 12, second 15 and another processor unit 18 to show that any number of processors may be used. A general purpose operating system 19 resides in memory 10 and can be executed by one or more of processors 12, 15, 18 within group of processors 6. Memory 10 also holds various other data 11 including programs and information for programs.

More specifically, as shown in FIG. 1, first processing unit 12 is running a continuous processing task 20 and second processing unit 15 is running both a discontinuous task 22 and operating system tasks 24 for operating system 19 while making a set of operating system services available to continuous processing task 20. An operating system scheduler 25 is provided to schedule operating system tasks 24 to run on group of processors 6. A processing schedule 30 resides in memory 10 and is available to operating system scheduler 25.

Discontinuous task 22 is a process identified as being interruptible by operating system scheduler 25. A hard real-time task 32 falls under the category of a discontinuous task because it may be removed at certain intervals from a processing unit. For example, if a hard real-time task must run every 20 milliseconds and only takes 5 milliseconds to run, the remaining time is generally used by operating system 19 to perform housekeeping functions. Operating system task 24 is defined as a discontinuous task that performs a function regarding operating system housekeeping or upkeep such as servicing interrupts, performing input/output operations, scheduling tasks, or managing memory 10.

Continuous processing task 20 is a process identified as not being 1o interruptible by operating system 19. Continuous processing task 20 must be allowed to run at all times in processor 12 without operating system interruption. Continuous processing task 20 may never be preempted. However, continuous processing task 20 may, at its discretion, perform discontinuous operations such as resource sharing is with discontinuous task 22.

Continuous processing task 20 can start a processing life cycle as discontinuous task 22. In typical hard real-time systems, a hard real-time task or operating system does not have the option of switching between continuous and discontinuous processing profiles. Typically, this is because a hard real-time operating system is running a general-purpose operating system 9 and a hard real-time task at the same time on the same processor. A task is either hard real-time or it is not hard real-time, resulting in a rigid creation of a hard real-time task.

Operating system scheduler 25 is responsible for allocating operating system tasks 24 to one of the group of processors 6 as well as managing a processing schedule 30 for system 5.

The invention can optionally utilize a user-level device driver 35 coupled with either an internal device 36 or an external device 37 for transmitting data 11 to continuous processing task 20. Internal device 36 is shown in continuous task processing system 5 and may be any subcomponent of a computing system that is fully contained by the computing system. Examples of items in this category are wired networking chips and connectors placed on a computer motherboard, internal wireless networking hardware, hard disk drives, Universal Serial Bus (USB) chips and their respective connectors. User-mode, non-kernel mode, or user-level device driver 35 is described as a software system that can communicate with external device 37 situated internally or externally to continuous task processing system 5. There may be a plurality of these driver and device combinations available to the continuous task processing system 5. User-level device driver 35 may exist without physical external device 37. External device 37 is any peripheral component of a computing system that is not contained by the computing system, but is instead attached to the computing system in some way. The attachment may be a physical cable or wireless protocol such as Bluetooth or 802.11, or other similar connection mechanism. Examples of external device 37 include a virtual device that provides random number generation, an Ethernet controller, a hard disk controller, a Universal Serial Bus device, or a display device.

Optionally, continuous processing task 20 may require a source of current time, a time reference 38. Continuous processing task 20 will refer to time reference 38 to manage the rate at which it produces output. Continuous processing task 20 may choose to wait for a certain amount of time to elapse, relative to time reference 38, if it completes a processing task ahead of time. Continuous processing task 20 may also choose to accelerate certain processing steps if it detects that the amount of work that it is completing over a period of time is not sufficient for the processing duties it has been assigned.

Timing pulse data 39 is also shown as a possible input or output of system 5. Timing pulse data 39 may be used to synchronize continuous processing task 20 and an external data source or external task. A device 40 to synchronize retrieving timing pulse data 39 from the network and to begin a continuous processing task routine may also synchronously or asynchronously retrieve timing pulse data 39 from the network to begin a continuous processing routine. Device to synchronize retrieving timing pulse data 40 is preferably a standard timing circuit connected to a crystal oscillator that generates a timing interrupt on a very regular basis. Preferably the timing interrupt is serviced immediately and synchronously with regard to the rest of the system operation. Examples of devices that asynchronously retrieve timing pulse data are a network time protocol daemon or a phase-locked loop circuit with timing input from another computing system. Preferably, in these systems, a low-frequency timing pulse from another computing system arrives at a particular moment specifying the current time. An internal process can then start updating the current time using more high-frequency devices, such as a crystal oscillator and an internal timing chip. Asynchronous timing devices are useful when using low-bandwidth mechanisms to distribute timing pulses. Instead of tasks being notified in a synchronous fashion, a counter 41 keeps track of current time and the task can query the time value asynchronously. Counter 41 represents any part of computing system 5 that is capable of storing state information and incrementing the value of that state information at a point in the future. Counter 41 is preferably a simple central processing unit register that stores a number value that is incremented periodically, but not necessarily monotonically. Counter 41 may also be connected to an oscillator that keeps track of the amount of time that has passed since it was started.

Time reference 38 can be managed via several techniques. One technique is the use of timing pulse data 39 that indicates the start of the next processing interval. Another technique is the use of a phase locked loop that is re-synchronized by external events or discontinuous task 22. Time reference 38 can be updated directly in continuous processing task 20 via user-level device driver 35. Yet another technique would be via operating system task 24, or discontinuous task 22, such as a Network Time Protocol daemon. The discontinuous task 10, or operating system task 24 would communicate time reference 38 update request via a process outlined in FIG. 3.

Figure 2:
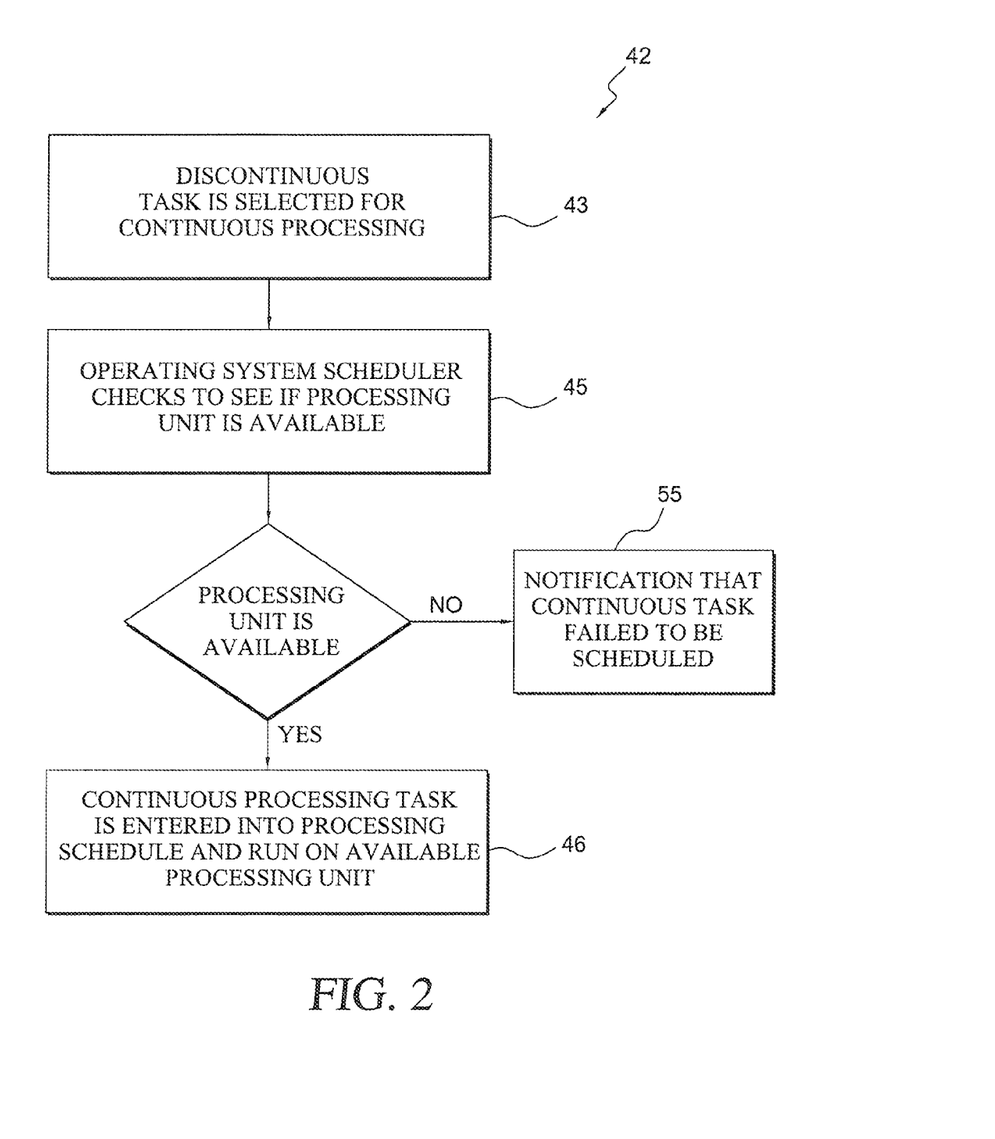
FIG. 2 is a flow chart illustrating the process of modifying a discontinuous task and specifying it as a continuous processing task.

The process 42 of starting continuous processing task 20 on a processor 12 is illustrated in FIG. 2. As step 43 outlines, discontinuous task 22 can elect to be raised to continuous processing task 20. The method in which this election is requested can be varied. In one aspect of the invention, a user of the system for processing continuous tasks 5 may notify operating system scheduler 25 that they want discontinuous task 22 to be scheduled as continuous processing task 20. This may be done via a command line command, a graphical user interface, or any other interactive input device. It may also be done in a programmatic way such as an operating system call, via another discontinuous task 22, or other automatic or non-interactive way.

In step 45, operating system scheduler 25 must then check to see if one or group of processors 6 is available to run continuous processing task 20. Operating system scheduler 25 does this by checking processing schedule 30. If there is an available processing unit 12, continuous processing task 20 is scheduled to run on that processing unit starting at the next available time slice, as shown in step 46. Continuous processing task 20 is scheduled as an infinitely long processing task by operating system scheduler 25. It monopolizes 100% of processing unit 12 until it notifies operating system scheduler 25 that it has completed.

If operating system scheduler 25 cannot allocate processor 12 for continuous processing, the election of discontinuous task 22 to become a continuous processing task 20 fails. In step 55, a notification method may be used to notify the user, device, system or second discontinuous task that the election failed.

Figure 3:
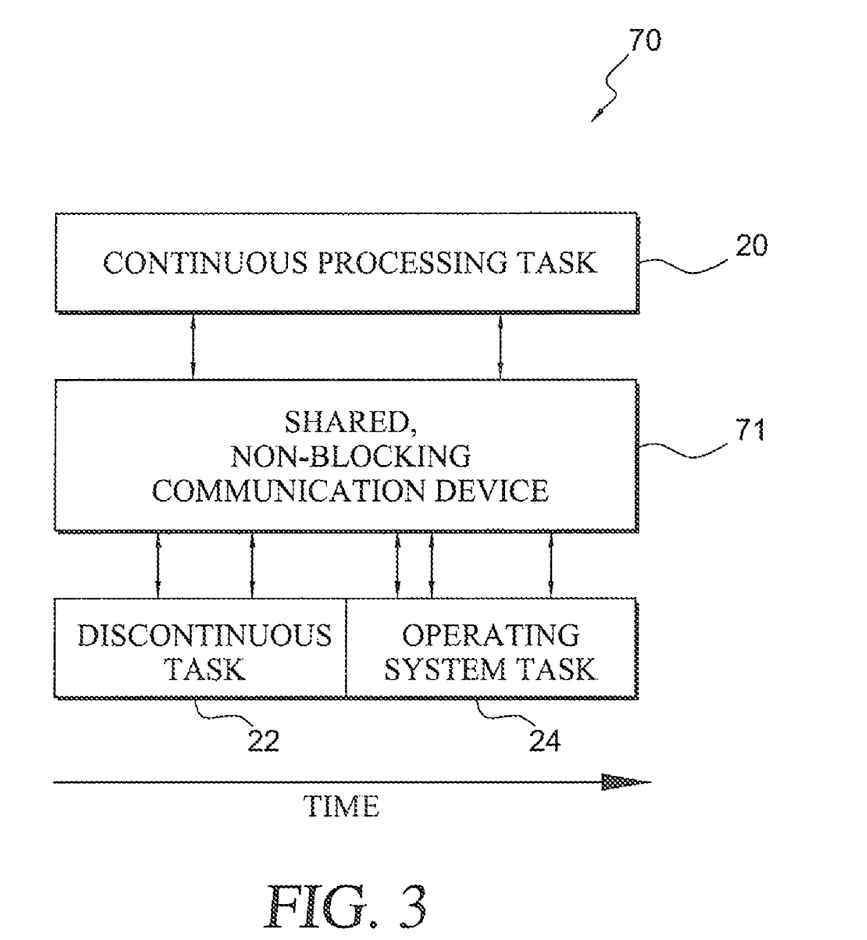
FIG. 3 is a time-based diagram of the processing unit utilization by the operating system as it schedules processes around the continuous processing task while communication is handled via a non-blocking, shared memory device.

FIG. 3 illustrates communication via a shared, non-blocking communication method 70. This can be any computing method or system that allows multiple processing tasks to communicate. The method of communication must be non-blocking in that a read-from or write-to a shared non-blocking communication device 71 does not cause continuous processing task 20 to take longer than is required to acquire any communication locks and perform the read or write operation. Continuous processing task 20 always is given the option of waiting, but is never required to wait when using shared, non-blocking communication method 70.

Common devices exist for performing non-blocking communication method 70. Shared memory 10 or message queues are two examples of communication devices in common general purpose operating systems. In both communication paradigms, a lock can be acquired before writing to or from communication device 7. The shared lock acquisition can be performed in two ways. The acquiring process may wait for the lock to be acquired, or continue processing if the lock cannot be immediately acquired.

Reading from or writing to the shared, non-blocking communication device 7 should be a constant time procedure. A read or a write to device 7 must not block continuous processing task 20 from executing for a non-deterministic period of time.

In some instances a monotonic task may be processed with first processing unit 12 in compressed time if all inputs to the monotonic task are known and first processing unit 12 can still provide processing resources to continuous processing task 20. A monotonic task is a process whose output is predictable for a certain period of time. An example of a monotonic function is the mathematical sine or cosine function where the input will increase from zero to a three over the period of one hour. Based on the previously stated parameters, the function of the output at a particular point in the next hour is predictable. A monotonic task operates in the same fashion as a monotonic function. In short, a monotonic task's output is deterministic when its inputs are known.

Other processing methods are available to continuous processing task 20 for performing calculations that are time rate-based in a compressed time method to achieve higher processing throughput. For example, if data 11 is a digital audio waveform being generated at 44 Khz, but processor 12 is capable of generating fifty 44 Khz digital audio waveforms, then continuous processing task 20 may process each waveform in compressed time. This would result in fifty-one 44 Khz waveforms being generated in the same amount of time it takes to play one 44 Khz digital waveform. This allows work to be done in a preloaded fashion, thus allowing more computing resources to be free over long term continuous processing tasks.

The same can be done for data 11 where inputs are known for a particular amount of time in the future. All processing may be done in compressed time if processing unit 12 is currently being under-utilized. This allows continuous processing task 20 to re-arrange processing resources dependent on knowing future input data, resulting in a deterministic and very efficient processing cycle.

One aspect of the invention allows watchdog support to be utilized by system 5 to ensure the good health of continuous processing task 20. Shared, non-blocking communication device 7 is utilized to send communication between continuous processing task 20 and operating system scheduler 25. If operating system scheduler 25 does not receive communication from continuous processing task 20 via shared, non-blocking communication method 70 then a routine may be performed by operating system scheduler 25 to recover the health of system 5. This operation may entail removing continuous processing task 20 from processor 12, signaling a system reset, or notifying continuous processing task 20 to perform a soft reset. The communication between continuous processing task 20 and operating system scheduler 25 does not have to be synchronous or periodic in nature.

Figure 4:
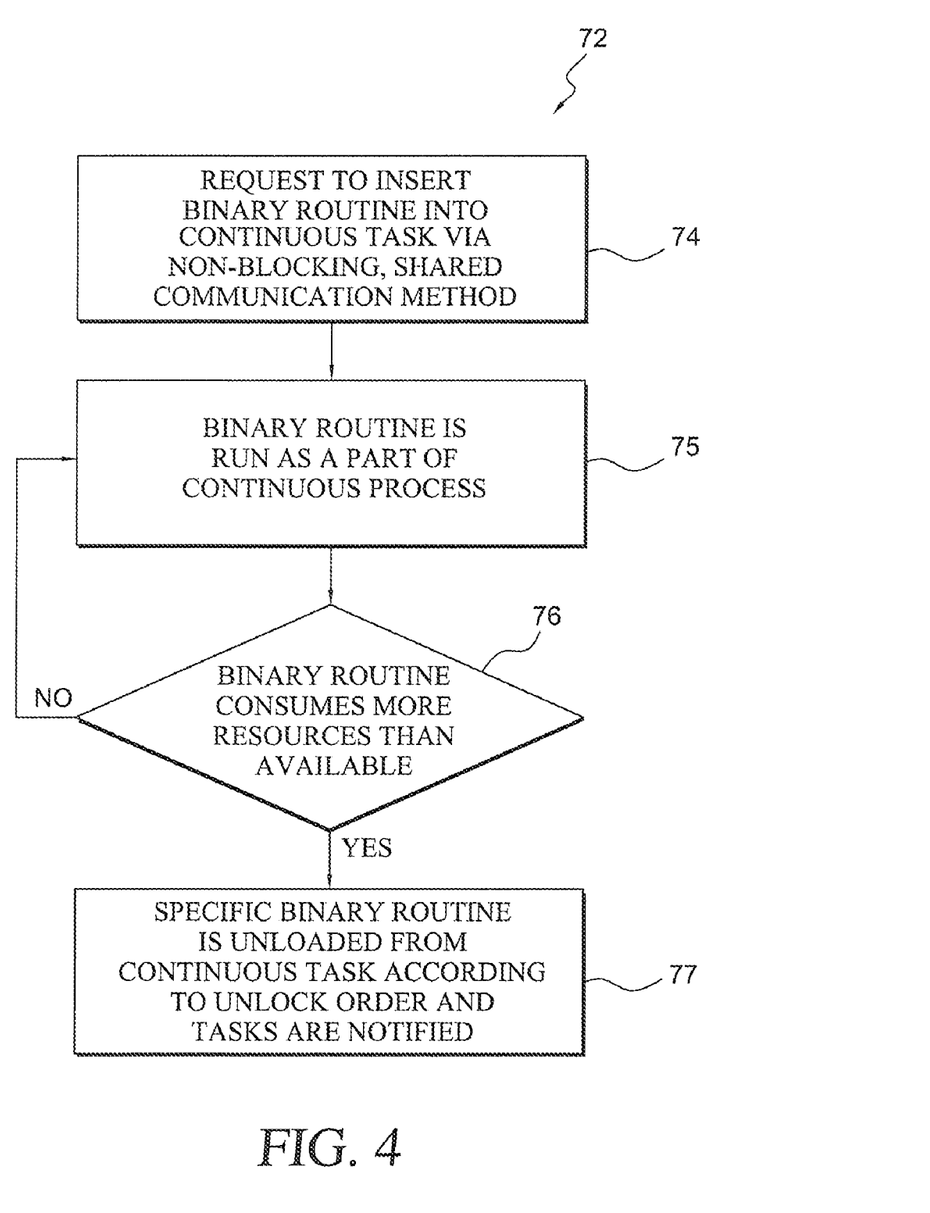
FIG. 4 is a flow chart describing the insertion of a binary routine into the continuous processing task at run-time, a load and unload order being specified, as well as how unload and notification is performed.

FIG. 4 outlines a method 72 to insert a binary routine 73 into continuous processing task 20. This method allows the insertion of additional program logic into continuous processing task 20 at step 75 without the need for continuous processing task 20 to stop running or degrade performance. It also provides a method to unload one or more binary routine 73 objects at steps 76 and 77 by detecting if binary routine 73 is consuming more resources than are available. Each binary routine 73 has a load 78 and unload 79 values. If binary routine 73 is consuming more resources than are available, execution of binary routine 73 with the highest unload order value is halted from within continuous processing task 20. This method provides smooth degradation of performance and immediate eviction of binary routines 73 that consume more resources than allocated, resulting in deterministic recoverable system design.

In the first step of process 72, as outlined in step 74, a user or process requests that a particular binary routine 73 be inserted into currently running continuous processing task 20. This request is accomplished via non-blocking, shared communication method 70. As part of continuous processing task 20 processing routine, it may optionally check for new binary routine 73 insertion requests and fulfill them at the continuous processing tasks 20 discretion.

A typical method of transport is via some sort of plug-in method or callable binary routine. This is a function pointer, a section of shared memory 10 with execution instructions, a shared library, an executable binary object, executable binary snippet and/or any executable binary code.

When the request is made to continuous processing task 20 to load binary routine 73, a load and unload order is specified. The load order notifies continuous processing task 20 in which order binary routine 73 must be inserted and started. The unload order notifies continuous processing task 20 in which order binary routine 73 should be stopped and removed. The load order is used for start-up purposes, some binary routines may need to execute before other ones. The unload order is used for shutdown and forced eviction purposes. When a set of binary routine 73 objects are consuming more resources than available, binary routine 73 with the highest unload value will be removed.

In step 75, binary routine 73 is loaded and executed according to the load order. For example, if at least two binary routine 73 load requests are to be processed at the same time, the load order is important. Binary routine 73 continues to execute to completion or until continuous processing task 20 recognizes that due to insertion of binary routine 73 objects that continuous processing task 20 is consuming more resources than are available.

If a resource availability problem occurs in continuous processing task 20, as described in step 76, binary routine 73 objects are removed in unload order from highest to lowest. A method is included via non-blocking, shared communication method 70 to notify other tasks that are dependent on binary routine 73 executing. The method may be via a message queue, area of shared memory 10 or other such non-blocking, shared communication method 70 described earlier in this document.

The process of loading and unloading binary routine 73 objects allows continuous process systems to operate at full speed without the need for any housekeeping operations from operating system task 24 or operating system scheduler 25. This approach is fundamentally different from the approach wherein continuous processing tasks are scheduled on the same processor based upon a process priority due to the nature of priority inversion issues and the need for operating system scheduler 25 to intervene.

The process described in FIG. 4 also allows for graceful extension and degradation of system 5 without the need for operating system scheduler 25 to preemptively re-arrange tasks. This ensures deterministic unloading of processing resources as well as deterministic messaging when those processing resources are unloaded. This is useful in situations when there are multiple dependent binary routine 73 objects running in continuous processing task 20. For example, if there are four digital signal processing routines running in continuous processing task 20 that are dependent on each other and a fifth enters that consumes more resources than are available, fifth binary routine 73 could be unloaded. This would notify an external task that could then send binary routine 73 to run on a separate system or ask for user intervention to re-allocate processing resources.

Figure 5:
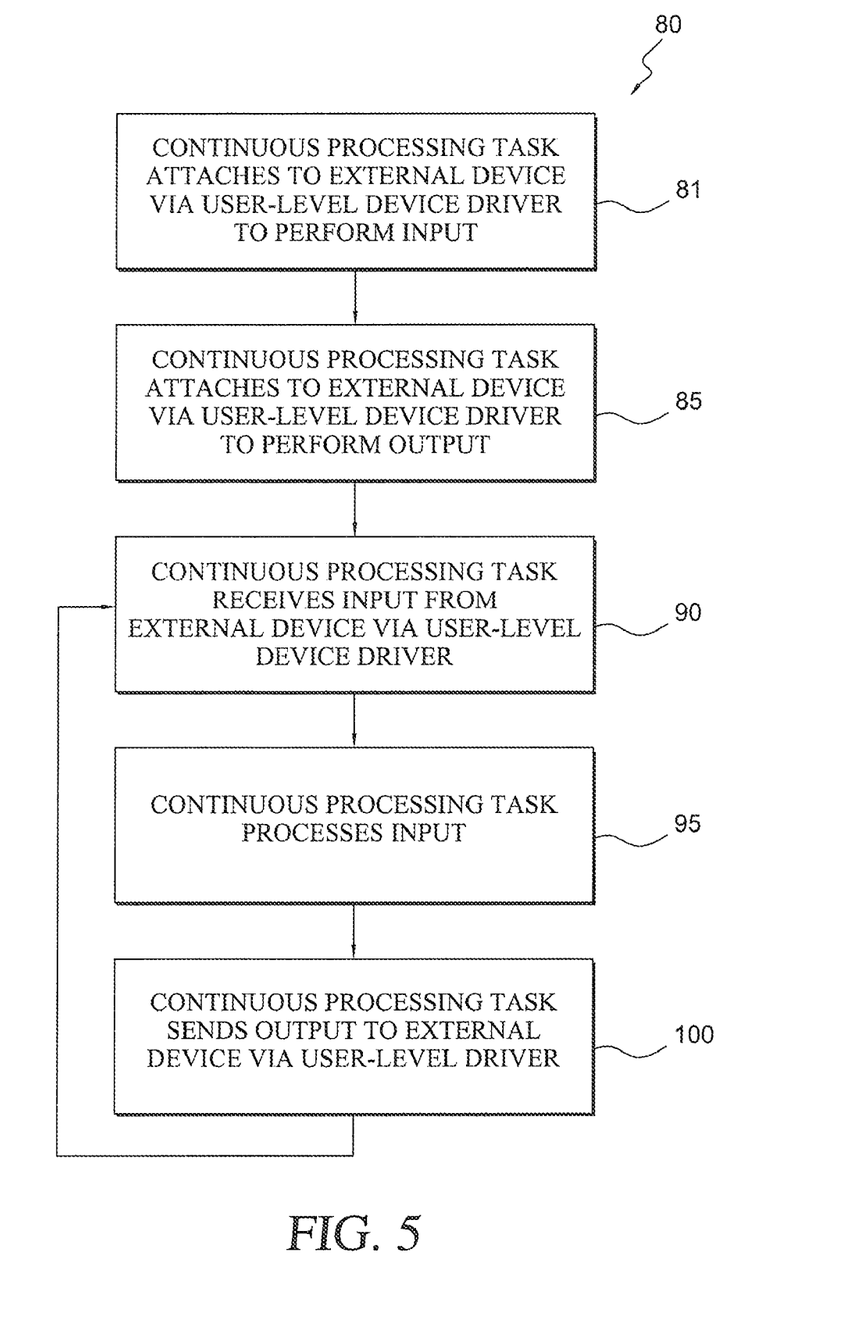
FIG. 5 is a flow chart outlining the process of providing user-level device drivers to receive, process and transmit data in a continuous flow without major operating system intervention.

As described in FIG. 5, a method 80 is provided for use of a plurality of user-level device drivers 35 from within continuous processing task 20. User-level device drivers 35 differ from kernel-level drivers in where the interrupt servicing routine is executed. In kernel-level device drivers, interrupt detection and interrupt servicing occur entirely in kernel mode. In user-level device drivers 35, interrupt detection occurs at the kernel-level leaving the interrupt servicing routine to the user-level portion of the driver.

It is beneficial to process interrupt detection in kernel-level and interrupt servicing in user-level for several reasons. The first being that catastrophic errors in kernel-level device drivers can create system instability or failure, but those same errors can be detected and avoided in user-level device drivers. The second being that it is far easier to develop and debug user-level drivers because of the variety of debugging tools available in user-level execution environments. While it can be argued that user-level device drivers are slower on operating systems utilizing only one processing unit under heavy load, due to the frequency of context switching that heavily taxed user-level device drivers can generate, the same does not apply for multi-processing unit configurations. The present invention utilizes a general purpose operating system 19 to detect interrupts while relying on a user-level device driver 35 being run in continuous processing task 20 to increase interrupt servicing routine throughput to and from continuous task system 5.

In step 81, continuous processing task 20, which is utilizing a user-level device driver 35, registers with operating system 19 to receive events from external device 37 for the purposes of receiving input. The registration is usually performed via an operating system call, may be performed via a shared, non-blocking communication device 7, or any other form of communication method with operating system 19. A system is provided such that user-level device driver 35 may check on the interrupt status of external device 37 and service the interrupt at its leisure. User-level device driver 37 is designated to perform communication between external and internal resources without resulting in any operating system overhead other than processing interrupt detection and flagging. Flagging as it relates to task management in operating system 19 is defined as any operation that results in an attribute becoming associated with a task. Preferably flags may include "starting", "executing", "running", "stopped", and "interruptible".

In step 85, continuous processing task 20, which is utilizing a user-level device driver 35, registers with operating system 19 to receive events from external device 37 for the purposes of sending output. The registration is usually performed via an operating system call, may be performed via a shared, non-blocking communication device 7, or any other form of communication method with operating system 19. A system is provided such that user-level device driver 35 may check on the interrupt status of external device 37 and service the interrupt at its leisure.

Once both input and output devices have been registered, ultra-low latency servicing of device data can begin in step 90. Typically, the present invention is used in continuous processing systems, such as parametric audio generation or video generation, but can be used in systems with non-monotonic timing requirements. Systems where zero latency is the goal and large buffers are not ideal or practical are good candidates for the present invention. Audio communication systems or simulation environments, for example, are ideal for the present invention. Thus, after input is detected via an interrupt, discontinuous task 22, such as operating system task 24, immediately acknowledges the interrupt and notifies continuous processing task 20 of pending input data. Continuous processing task 20 is optionally polling each user-level device driver 35 interrupt flag. If continuous processing task 20 detects an interrupt service request, the interrupt is serviced according to continuous processing task 20 servicing routine. The input data is retrieved from external device 37.

When the input data is available to continuous processing task 20, it may further process the data as described in step 95. This processing step is generic and can involve any system capabilities available to continuous processing task 20, which are the same capabilities available to the general purpose operating system.

Once the input data has been processed in step 95, output data can optionally be created and sent to external device 37 via user-level driver 35 as shown in step 100. Data may also be sent to external device 37 using a kernel-level driver or operating system call, but response latency could be sacrificed.

If further input processing is required, the process returns to step 90 and continues as long as continuous processing task 20 deems necessary.

Figure 6:
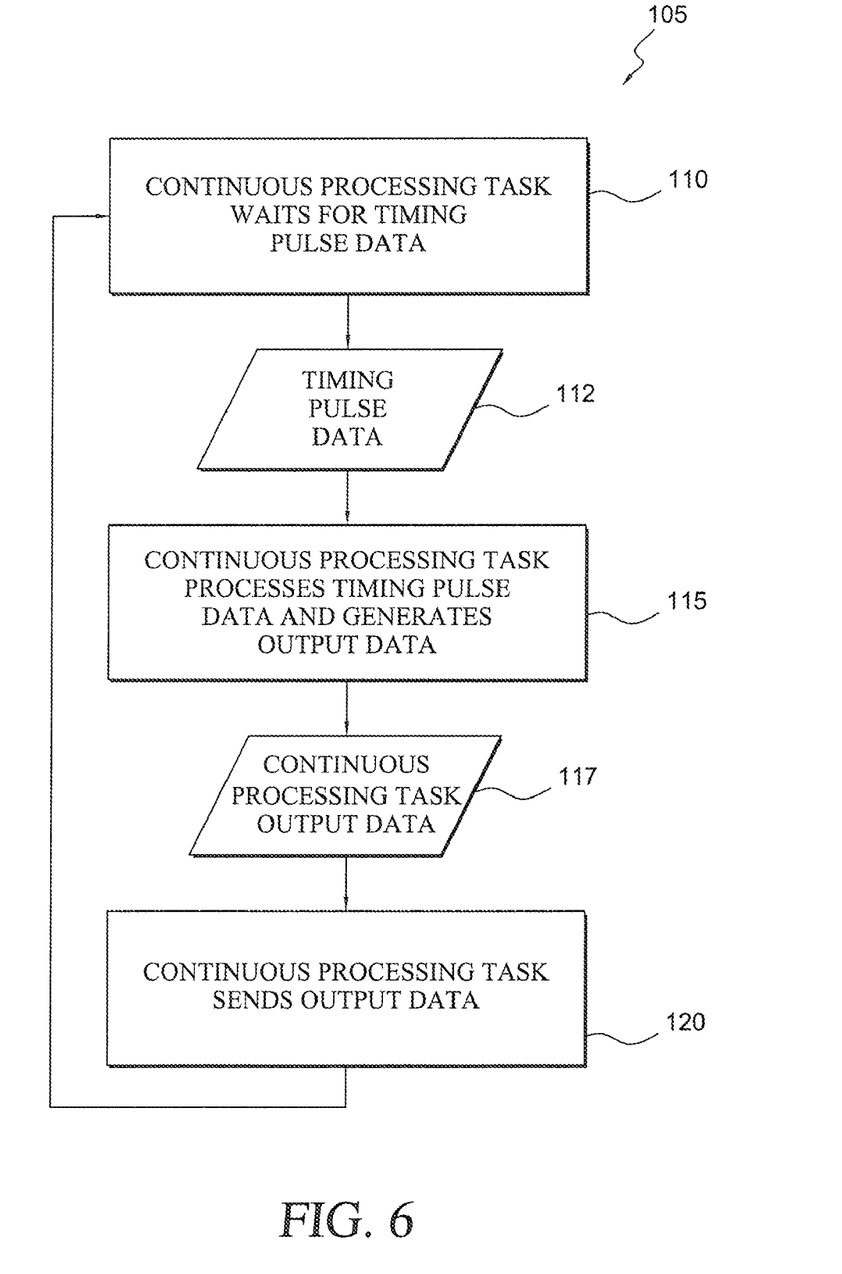
FIG. 6 is a flow chart detailing how external devices can communicate with the continuous processing task based on timing pulse data.

For external synchronization of continuous processing task 20, a method is devised in FIG. 6 that waits for timing pulse data 39 to perform specific continuous processing task 20 routines. The timing pulse data 39 can be either monotonic or non-monotonic in nature. In the present invention, synchronized timing pulse data 39 for processing are not required due to the ultra-low latency of the system design. Rather, timing pulse data 39 may be asynchronously event driven and not necessarily tied to a constant external clock. This is of benefit because synchronization is not required before continuous processing task 20 may contribute to the distributed processing task.

As shown in step 110, continuous processing task 20 waits for timing pulse data 39 to arrive via internal 36 or external device 37, system or method. Once continuous processing task 20 receives timing pulse data 39 in step 112, it then uses timing pulse data 39 in step 115 to process data 11 and produce output in step 115 that is required by another discontinuous task 10 or another continuous processing task 20. The task may be internal or external to continuous task system 5. Continuous processing task 20 can then send output data 117 to a receiving task as shown in step 120. Step 120 includes continuous processing task 20 sending output data 117 via non-blocking shared communications device 70, via user-level device driver 35, or another communication method available to continuous processing task 20. The method then goes back to step 110 and the process continues from the beginning.

Figure 7:
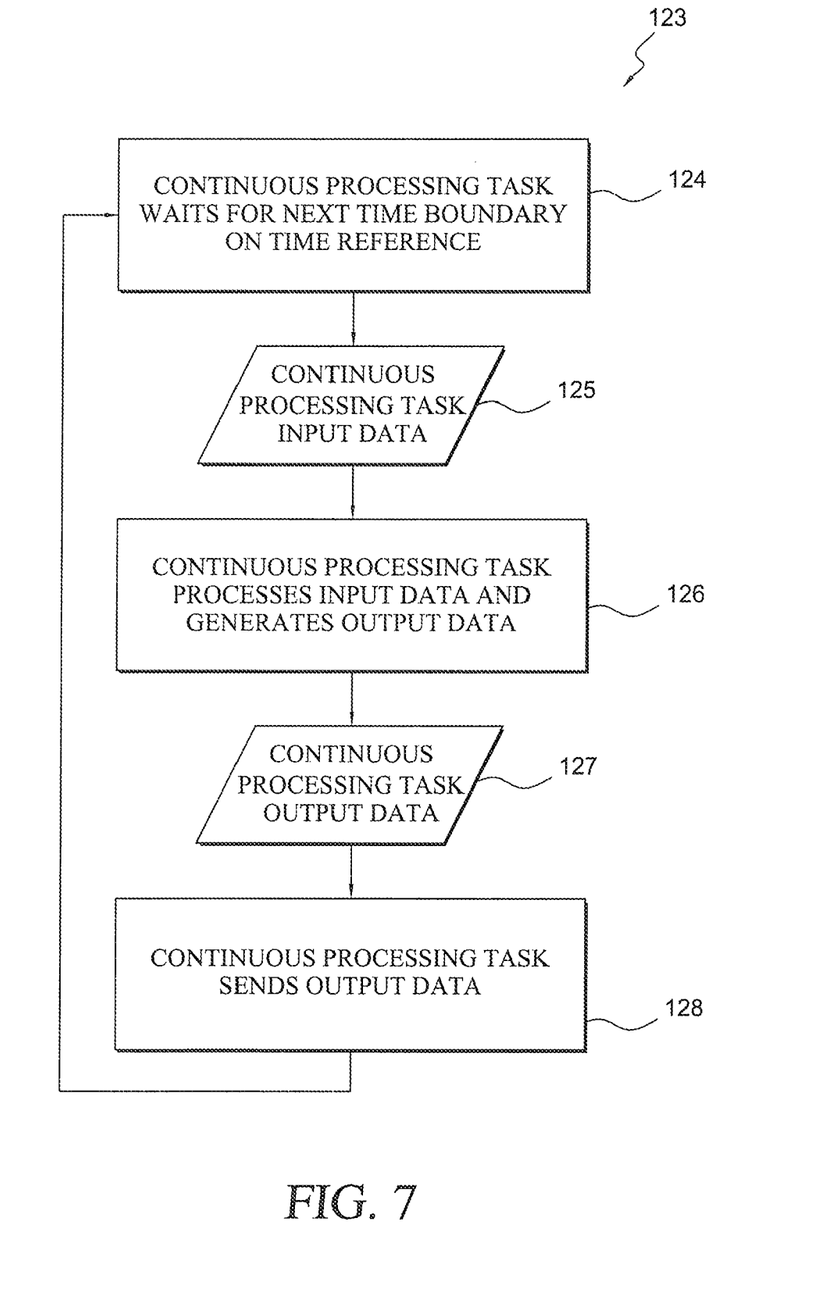
FIG. 7 is a flow chart detailing continuous process flow control based on the timing reference.

An alternative method of time synchronization 123 is described in FIG. 7, which is essentially the same as that described above in FIG. 6 except for step 124. In step 124, instead of waiting for external timing pulse data 39, the wait period is a certain point in time as determined from time reference 38. In one example, a 1 kilohertz sampled system would wait on time reference 38 until the next 1 millisecond time boundary. Time reference 38 is synchronized between continuous processing elements either via direct timing pulse data 39 or received via a user-level device driver 35 running from within the continuous processing task 20. Another method of synchronizing time reference 38 is via the communication of time errors through shared non-blocking communication device 7. Yet another method of synchronizing time reference 38 is via a phase locked loop technique, which can be achieved either by continuous processing task 20, or by equivalent discontinuous process 10, such as a Network Time Protocol client or daemon process.

In step 125, time reference 38, is integrated into continuous processing task 20 and calculation of output data 117 is performed. The next step, step 126, is the same as step 115 described in FIG. 6. Similarly, steps 127 and 128 are analogous to steps 117 and 120 of FIG. 6.

Figure 8:
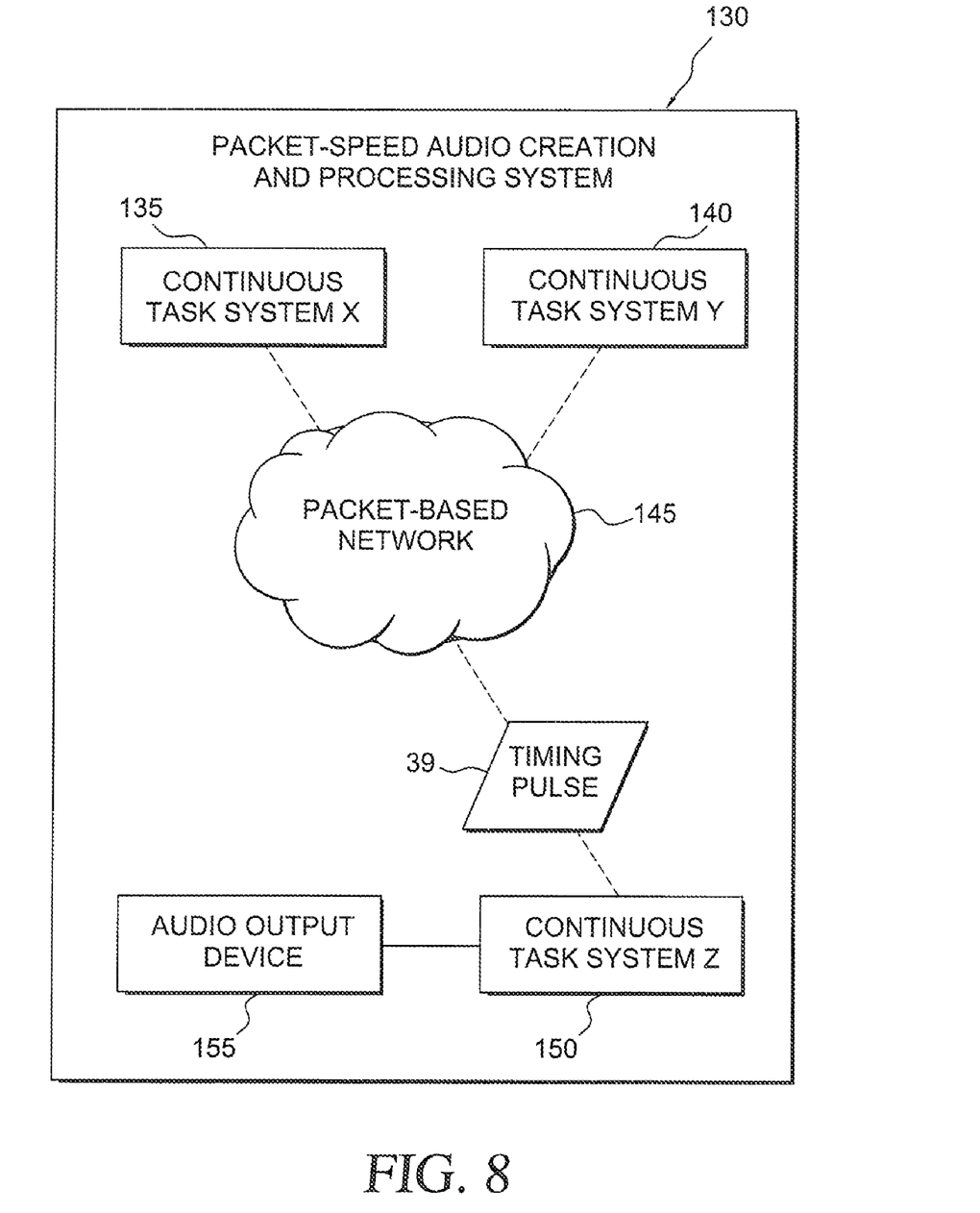
FIG. 8 is a system diagram of a preferred embodiment of the invention that is a packet-based audio creation and processing system.

A preferred embodiment of the invention, described in FIG. 8, is a packet-speed audio creation and processing system 130. Requirements for this system are for minimally buffered or non-buffered audio creation, processing and transmission. A number of computer systems or continuous task systems including a first computer system marked as continuous task system X 135 and a second computer system marked as continuous task system Y 140 shown communicating via a packet-based network 145 with a target continuous task system Z 150, work in unison to provide audio at close to theoretical latency and transmission speeds to audio output device 155.

Each system for continuous tasks 5 runs a digital signal processing task as continuous processing task 20. Timing pulse data 39 synchronizes processing events, but is not required to be sent at a regular interval or clock rate.

The packet-speed audio creation and processing system 130 is configured in such a way as to order any dependent digital signal processing tasks in dependency order across multiple systems. For example, continuous task system X 135 provides continuous task system Y 140 varied frequency sound data. The varied frequency sound data consumes 99% of the processing resources available to continuous task system X 135. Continuous task system Y 140 then utilizes 99% of processing resources available to process the varied frequency sound data such that it sounds like it is being sent through a bandpass audio filter. The band-passed audio data is then sent to continuous task system Z 150 which performs some modification to the sound before sending it to audio output device 155.

The packet-speed audio creation and processing system 130 embodiment allows for the lowest possible latency when generating, processing and expressing audio with unknown or variable inputs. It also demonstrates how the technology would be deployed to solve an audio processing problem that overwhelms a single continuous processing task system in raw processing requirements.

Although others have created hard real-time operating systems, i.e., scheduling systems that guarantee deterministic behavior and low-latency patches to general purpose operating systems, system response is still far from the theoretical possibilities. The present invention is considered to be advantageous for at least the following reasons:

1. The system allows a non-kernel-level process to run at full theoretical speed.
2. The system allows a non-kernel-level process to respond to hardware events at full theoretical speed.
3. Continuous processing task 20 program development can occur with standard tools running on standard software and hardware. Catastrophic errors can be caught at any point and do not necessarily lead to system instability.
4. The system is implementable on any general purpose operating system without the need for any specialized hardware other than access to two processing units.
5. The system provides a method to synchronize a continuous processing task 20 with another task based on an event timer that may be synchronous or asynchronous.
6. The system can generate and process data at wire-speeds instead of being limited to operating system speeds caused by operating system task 24 overhead. The continuous processing task 20, while running at full speed, can still access general purpose operating system functionality.

Although described with reference to a preferred embodiment of the invention, it should be readily understood that various changes and/or modification can be made to the invention without departing from the spirit thereof. While this description concerns a detailed, complete system, it employs many inventive concepts, each of which is believed patentable apart from the system as a whole. The use of sequential numbering to distinguish the methods employed is used for descriptive purposes only, and is not meant to imply that a user must proceed from one step to another in a serial or linear manner. In general, the invention is only intended to be limited by the scope of the following claims.

We claim:

1. A computer system for processing data comprising
a first processing unit;
a second processing unit;
a memory for storing data accessible by the first and second processing units;
a general purpose operating system;
a continuous processing task that cannot be preempted by the operating system;
a scheduler for assigning the continuous processing task to the first or second processing unit;
a discontinuous task assignable to the first processing unit when the first processing unit is not assigned the continuous processing task;
a non-blocking, shared communications device for communicating with the continuous processing task; and
a binary routine for extending functionality of the continuous processing task that is added to the continuous processing task, via the communications device, said binary routine having a load value and an unload value associated therewith which are utilized when starting and stopping the binary routine.

2. The computer system of claim 1, further comprising:
an external device;
an internal device; and
a plurality of user-level device drivers running in the continuous processing task, said device drivers connected to one of the internal device and the external device for transmitting input data to the continuous processing task.

3. The computer system of claim 2, further comprising:
a network connected to the continuous processing task; and
a device to synchronously retrieve timing pulse data from the network to begin the continuous processing task.

4. The computer system of claim 2, further comprising:
a network connected to the continuous processing task; and
a device to asynchronously retrieve timing pulse data from the network to begin the continuous processing task.

5. The computer system of claim 2, wherein the input data being processed is an audio waveform data.

6. A processing system comprising:
a first computer system for processing data including: a first processing unit, a second processing unit, a memory for storing data information accessible by the first and second processing units, a general purpose operating system, a continuous processing task that cannot be preempted by the operating system, and a scheduler for assigning the continuous processing task to the first or second processing unit;
a discontinuous task assignable to the first processing unit when the first processing unit is not assigned the continuous processing task;

a non-blocking, shared communications device for communicating with the continuous processing task;
a binary routine for extending functionality of the continuous processing task, that is added to the continuous processing task via the communications device, said binary routine having a load and an unload value associated therewith which are utilized when starting and stopping the binary routine; and
a second computer system.

7. In a computer system for processing data comprising a first processing unit, a second processing unit, a memory for storing data information accessible by the first and second processing units and a general purpose operating system, a method comprising:
assigning a continuous processing task to the first or second processing unit so that the continuous processing task cannot be preempted by the general purpose operating system;
assigning a discontinuous processing task to the first processing unit when the first processing unit is not assigned the continuous processing task;
communicating between the continuous processing task and the discontinuous processing task with a non-blocking, shared communications device;
having the discontinuous processing task communicate with the continuous processing task, via the non-blocking, shared communications device, to add a binary routine to execute within the continuous processing task for extending functionality of the continuous processing task, said binary routine having a load value and an unload value associated therewith which are utilized when starting and stopping the binary routine; and
stopping the continuous processing task from running only when requested by the continuous processing task.

8. The method of claim 7, further comprising:
choosing a processing unit that is not running any continuous processing task to run a the continuous processing task.

9. The method of claim 7, further comprising:
executing a monotonic task with the first processing unit in compressed time if all inputs to the monotonic task are known and if the first processing unit can still provide processing resources to the continuous processing task.

10. The method of claim 7, further comprising:
utilizing the load and unload values when starting and stopping the binary routine due to excessive use of the first processing unit.

11. The method of claim 10, further comprising:
notifying continuous processing tasks and discontinuous processing tasks when the binary routine is stopped.

12. The method of claim 11, further comprising:
designating a user-level device driver to perform communication between external and internal resources without resulting in any operating system overhead other than processing interrupt detection and flagging.

13. The method of claim 12, further comprising:
employing the user-level device driver inside the continuous processing task to perform input and output operations.

14. The method of claim 11, further comprising:
updating a counter via the non-blocking shared communications device; and
notifying a scheduler if a counter is not updated in a specific time increment.

15. The method of claim 7, further comprising:
receiving timing pulse data via the communication device; and
executing a routine within the continuous processing task based upon the timing pulse data.

16. The method of claim 7, further comprising:
partnering with other systems that are available via the communication device.

17. The method of claim 7, further comprising:
splitting continuous processing tasks among additional continuous processing task processing systems such that minimum processing latency is achieved by performing dependent serial or parallel steps on systems external to the computer system.

18. The method of claim 7, further comprising:
linking output from the computer system to input from additional continuous processing system systems, such that latency is only introduced by communication network transmission and system input and output device handling routines.

19. The method of claim 7, further comprising:
providing time reference information to the continuous processing task; and
executing a routine within the continuous processing task based on the time reference information.

20. The method of claim 7, further comprising:
synchronously unloading the binary routine without interrupting the continuous processing task.

21. The method of claim 15, further comprising:
executing additional continuous processing tasks based upon the timing pulse.

* * * * *